US011631970B2

(12) United States Patent
Ohira et al.

(10) Patent No.: US 11,631,970 B2
(45) Date of Patent: Apr. 18, 2023

(54) JUNCTION BOX AND POWER STORAGE DEVICE

(71) Applicants: TOYOTA JIDOSHA KABUSHIKI KAISHA, Toyota (JP); SUMITOMO WIRING SYSTEMS, LTD., Mie (JP)

(72) Inventors: Yuki Ohira, Nisshin (JP); Yoshiki Yanagita, Yokkaichi (JP); Yoshimasa Tanuma, Yokkaichi (JP); Takumi Ejima, Yokkaichi (JP); Tatsuya Fujisaka, Yokkaichi (JP); Takayuki Takeuchi, Yokkaichi (JP)

(73) Assignees: TOYOTA JIDOSHA KABUSHIKI KAISHA, Toyota (JP); SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/119,211

(22) Filed: Dec. 11, 2020

(65) Prior Publication Data
US 2021/0226432 A1  Jul. 22, 2021

(30) Foreign Application Priority Data

Jan. 20, 2020  (JP) .............................. JP2020-006743

(51) Int. Cl.
*H02G 3/08* (2006.01)
*B60R 16/023* (2006.01)
*H02G 3/16* (2006.01)
*B60L 1/00* (2006.01)
*B60L 50/60* (2019.01)

(52) U.S. Cl.
CPC .................. *H02G 3/16* (2013.01); *B60L 1/00* (2013.01); *B60L 50/66* (2019.02); *B60R 16/0238* (2013.01)

(58) Field of Classification Search
CPC ............ H02G 3/16; H02G 3/08; H02G 3/088; H02G 3/081; H05K 5/069; H05K 5/0247; B60R 16/0238; B60R 16/0239; B60R 16/03; B60R 16/033; B60R 16/04; G01V 3/02; G01M 3/15; G01M 3/045
See application file for complete search history.

(56) References Cited

U.S. PATENT DOCUMENTS

| 4,593,275 | A | * | 6/1986 | Kazandjoglou | .......... | G01V 3/02 |
| | | | | | | 324/696 |
| 10,921,209 | B2 | * | 2/2021 | Jung | ....................... | G01M 3/16 |
| 2019/0339153 | A1 | | 11/2019 | Jung et al. | | |

FOREIGN PATENT DOCUMENTS

| DE | 10 2016 013 754 A1 | 5/2018 |
| EP | 2787556 A1 | 10/2014 |
| JP | 5979508 B2 | 8/2016 |
| JP | 2019-200858 A | 11/2019 |
| WO | 2013/080567 A1 | 6/2013 |

\* cited by examiner

*Primary Examiner* — Hoa C Nguyen
*Assistant Examiner* — Amol H Patel
(74) *Attorney, Agent, or Firm* — Sughrue Mion, PLLC

(57) ABSTRACT

A junction box includes a housing having a plurality of side wall portions, and a liquid detector including a first terminal portion and a second terminal portion. The junction box is disposed in a housing case housing a power storage module. The first terminal portion and the second terminal portion are directed toward a lower side of one of the side wall portions and drawn out from the inside of the housing to the outside of the housing.

7 Claims, 4 Drawing Sheets

JUNCTION BOX AND POWER STORAGE DEVICE

CROSS-REFERENCE TO RELATED APPLICATION

This application claims priority to Japanese Patent Application No. 2020-006743 filed on Jan. 20, 2020, incorporated herein by reference in its entirety.

BACKGROUND

1. Technical Field

The disclosure relates to a junction box and a power storage device.

2. Description of Related Art

Various types of vehicles equipped with a power storage device have been developed. In the power storage device, a power storage module such as a battery module is housed in a housing case. The power storage device is sometimes installed under a vehicle body of the vehicle. The housing case is kept in a sealed state, but depending on a change in the external environment such as the weather or the road condition, it can happen that a liquid such as water enters the housing case.

Japanese Patent No. 5979508 (JP 5979508 B) discloses a technique that detects a liquid having entered a housing case and discharges the entered liquid to the outside of the housing case. Specifically, in the case of a power storage device in JP 5979508 B, an openable lid is provided at a bottom portion of the housing case, and when a sensor disposed in the housing case detects a liquid having entered the housing case, the lid is opened.

SUMMARY

Since the housing case is kept in the sealed state as described above, it can happen that the liquid enters the housing case little by little taking time. In JP 5979508 B, a specific configuration of the sensor is not disclosed. Therefore, there is concern that, depending on the configuration of the sensor, it takes a considerable time until the liquid is accumulated to a detectable liquid level, leading to a delay in the detection of the liquid.

The disclosure provides a junction box that can easily detect a liquid around the junction box, and further provides a power storage device including such a junction box.

A first aspect of the disclosure is a junction box that is disposed in a housing case housing a power storage module. The junction box includes a housing having a plurality of side wall portions, and a liquid detector including a first terminal portion and a second terminal portion. The first terminal portion and the second terminal portion are directed toward a lower side of one of the side wall portions and drawn out from the inside of the housing to the outside of the housing.

In the first aspect, the first terminal portion and the second terminal portion forming the liquid detector are directed toward the lower side of the side wall portion and drawn out from the inside of the housing to the outside of the housing. Therefore, by disposing the junction box in the housing case (more specifically, on a bottom portion of the housing case) housing the power storage module, when a liquid enters the housing case, the first terminal portion and the second terminal portion can easily come in contact with the liquid present around the housing. As a result, the first terminal portion and the second terminal portion conduct to each other through the liquid present around the housing so that it is possible to easily detect the liquid.

In the first aspect, in a disposition state where the junction box is disposed in the housing case, the side wall portions may include a front wall portion facing forward. In this case, the first terminal portion and the second terminal portion may be drawn out from a side of the front wall portion to the outside of the housing.

According to above configuration, when a vehicle or the like equipped with the housing case is inclined so that the housing case is inclined downward toward the front side, a liquid having entered the housing case also moves toward the front side. Therefore, by drawing out the first terminal portion and the second terminal portion from the front wall portion side of the housing located on the front side to which the liquid tends to move, the detection of the liquid is further facilitated.

In the first aspect, in the disposition state, the front wall portion may have one end on one side in a width direction crossing a front-rear direction. In this case, the first terminal portion and the second terminal portion may be drawn out to the outside of the housing on a side of the one end.

According to above configuration, by drawing out the first terminal portion and the second terminal portion to the outside of the housing on the one end side of the front wall portion, the first terminal portion and the second terminal portion can be arranged in close proximity to each other. Consequently, the electrical resistance of a liquid connecting the first terminal portion and the second terminal portion to each other can be made small so that the detection of the liquid is furthermore facilitated.

In the first aspect, the housing may include an upper case and a closure member, the upper case including the side wall portions and being open downward, and the closure member closing an opening of the upper case. In this case, a first cover portion and a second cover portion may be provided at the one of the side wall portions from which the first terminal portion and the second terminal portion are drawn out, the first cover portion being open downward and covering the first terminal portion, and the second cover portion being open downward and covering the second terminal portion.

According to above configuration, the first terminal portion is covered by the first cover portion being open downward, and the second terminal portion is covered by the second cover portion being open downward. Consequently, while ensuring the entry path of a liquid, it is possible to protect the first terminal portion and the second terminal portion drawn out to the outside of the housing.

In the first aspect, the closure member may include a first protruding portion and a second protruding portion, the first protruding portion protruding into the first cover portion to approach a distal end of the first terminal portion, and the second protruding portion protruding into the second cover portion to approach a distal end of the second terminal portion.

According to above configuration, by providing the closure member with the first protruding portion protruding into the first cover portion and the second protruding portion protruding into the second cover portion, it is possible to suppress the entry of foreign matter into the first cover portion and the second cover portion and thus is possible to suppress the entry of foreign matter into the housing.

In the first aspect, a first through-hole may be provided in the first cover portion at a position higher than a distal end of the first terminal portion, and a second through-hole may be provided in the second cover portion at a position higher than a distal end of the second terminal portion.

According to above configuration, when a liquid enters the first cover portion and the second cover portion, the air in the first cover portion and the second cover portion can be discharged to the outside through the first through-hole and the second through-hole, respectively. Consequently, it is possible to easily cause the liquid to enter the first cover portion and the second cover portion.

In the first aspect, a first passing-through portion through which the first terminal portion passes, and a second passing-through portion through which the second terminal portion passes may be provided in the housing. The distal end of the first terminal portion may be located at a position lower than the first passing-through portion, and the distal end of the second terminal portion may be located at a position lower than the second passing-through portion. In this case, the first through-hole may be provided at a position lower than the first passing-through portion, and the second through-hole may be provided at a position lower than the second passing-through portion.

According to above configuration, the first through-hole provided in the first cover portion may be provided at the position lower than the first passing-through portion where the first terminal portion passes through the housing, and the second through-hole provided in the second cover portion may be provided at the position lower than the second passing-through portion where the second terminal portion passes through the housing. When a liquid enters the first cover portion and the second cover portion, the air pressure in the first cover portion and the second cover portion above the first through-hole and the second through-hole increases. Consequently, it is possible to suppress that the liquid having entered the first cover portion and the second cover portion reaches the first passing-through portion and the second passing-through portion located at positions higher than the first through-hole and the second through-hole, respectively. As a result, it is possible to suppress the entry of the liquid into the housing.

A second aspect of the disclosure is a power storage device including the junction box. The junction box includes a housing having a plurality of side wall portions, a liquid detector including a first terminal portion and a second terminal portion. The junction box is disposed in a housing case housing a power storage module. The first terminal portion and the second terminal portion are directed toward a lower side of one of the side wall portions and drawn out from an inside of the housing to an outside of the housing. The power storage device includes the power storage module, and the housing case having a bottom portion and housing the power storage module and the junction box. The junction box is fixed to the bottom portion of the housing case.

According to the second aspect, since the junction box is disposed on the bottom portion of the housing case, a liquid having entered the housing case can be easily detected in the power storage device.

According to the first aspect of the disclosure, it is possible to provide a junction box that can easily detect a liquid around the junction box. According to the second aspect of the disclosure, it is possible to provide a power storage device including a junction box that can easily detect a liquid around the junction box.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
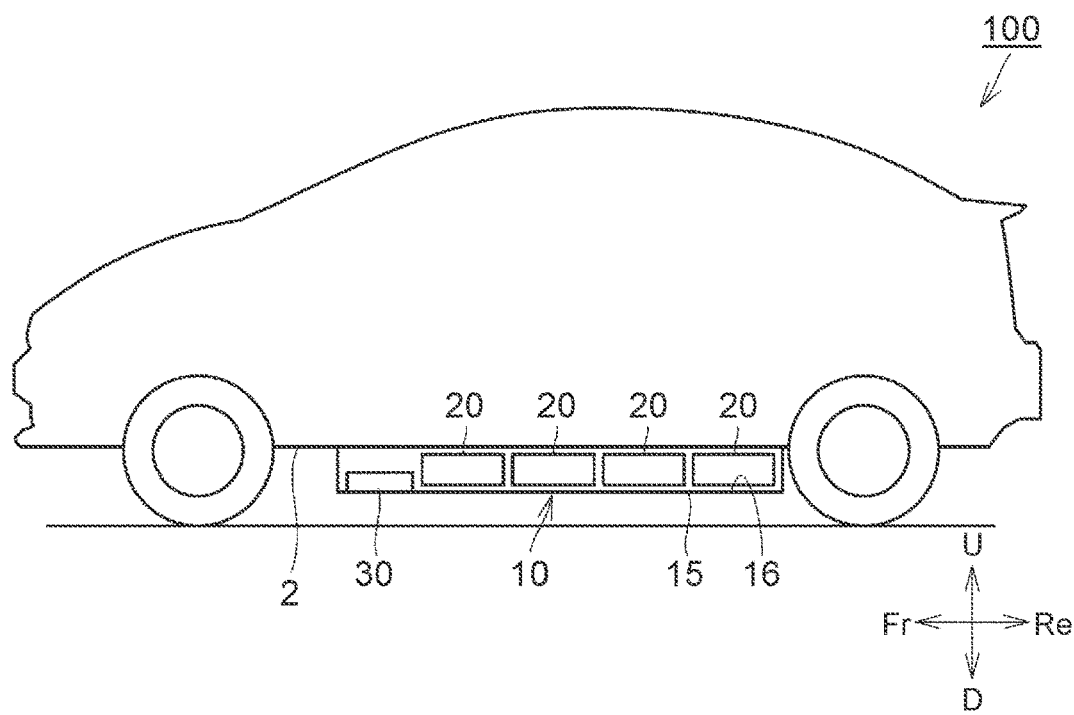
FIG. 1 is a schematic diagram illustrating a vehicle equipped with a power storage device according to a first embodiment.

Hereinafter, embodiments of the disclosure will be described in detail with reference to the drawings. In the embodiments described below, the same signs will be given to the same or common portions in the drawings, and a description thereof will not be repeated.

In the drawings, arrow U represents the upward direction, arrow D the downward direction, arrow Fr the front direction of a vehicle, arrow Re the rear direction of the vehicle, arrow L the left direction of the vehicle, and arrow R the right direction of the vehicle.

First Embodiment

FIG. 1 is a schematic diagram illustrating a vehicle 100 equipped with a power storage device 10 according to a first embodiment. Referring to FIG. 1, the vehicle 100 equipped with the power storage device 10 according to the first embodiment will be described.

As illustrated in FIG. 1, the vehicle 100 is equipped with the power storage device 10. The vehicle 100 is a hybrid vehicle that can travel using power of at least one of a motor and an engine, or an electric vehicle that travels by driving force obtained by electrical energy. The power storage device 10 can be used as a drive source of the vehicle 100 thus configured.

The power storage device 10 is disposed, for example, under a floor panel 2 of the vehicle 100. The power storage device 10 includes a housing case 15, a plurality of power storage modules 20, and a junction box 30.

The housing case 15 is formed by an upper case and a lower case. The power storage modules 20 and the junction box 30 are housed in the housing case 15. The housing case 15 has a bottom portion 16, and the junction box 30 is fixed to the bottom portion 16.

The power storage modules 20 are arranged, for example, side by side in the front-rear direction of the vehicle 100.

The power storage modules 20 each include a plurality of power storage cells (not illustrated). The power storage cells are arranged side by side in the right-left direction of the vehicle 100.

Each of the power storage cells is, for example, a secondary battery such as a nickel hydride battery or a lithium ion battery. The power storage cell may use a liquid electrolyte or a solid electrolyte. The power storage cell may be a unit capacitor configured to be chargeable and dischargeable. The power storage cell has, for example, a square shape.

In the disposition state where the junction box 30 is disposed in the housing case 15, the junction box 30 is located forward of the power storage modules 20. The junction box 30 is electrically connected to the power storage modules 20. The junction box 30 is a device configured to relay electrical connection between devices (an electrical distribution box).

Figure 2:
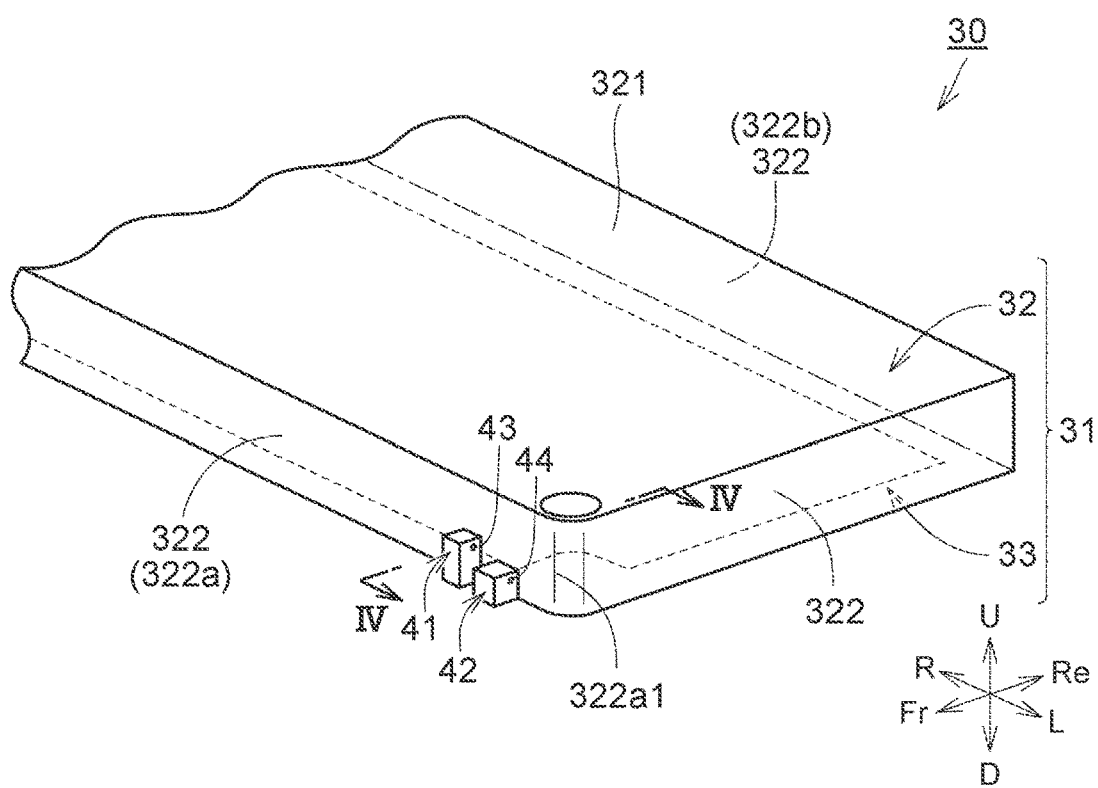
FIG. 2 is a schematic perspective view illustrating the upper side of a junction box according to the first embodiment.
Figure 3:
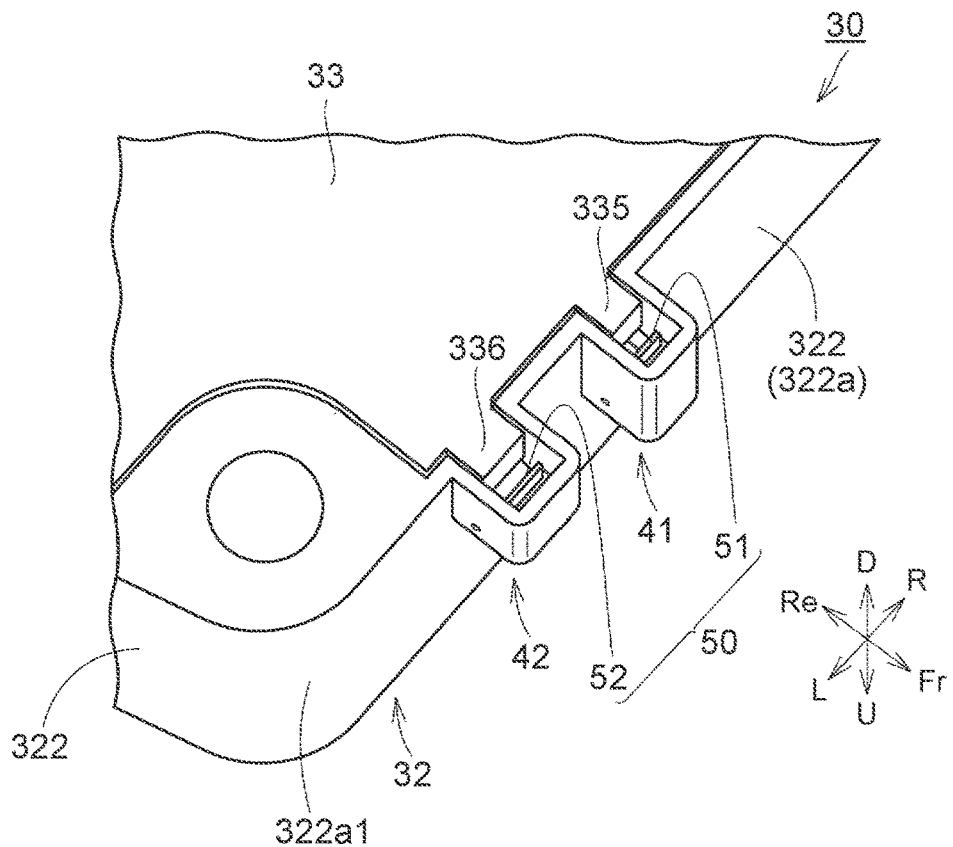
FIG. 3 is a schematic perspective view illustrating the lower side of the junction box according to the first embodiment.
Figure 4:
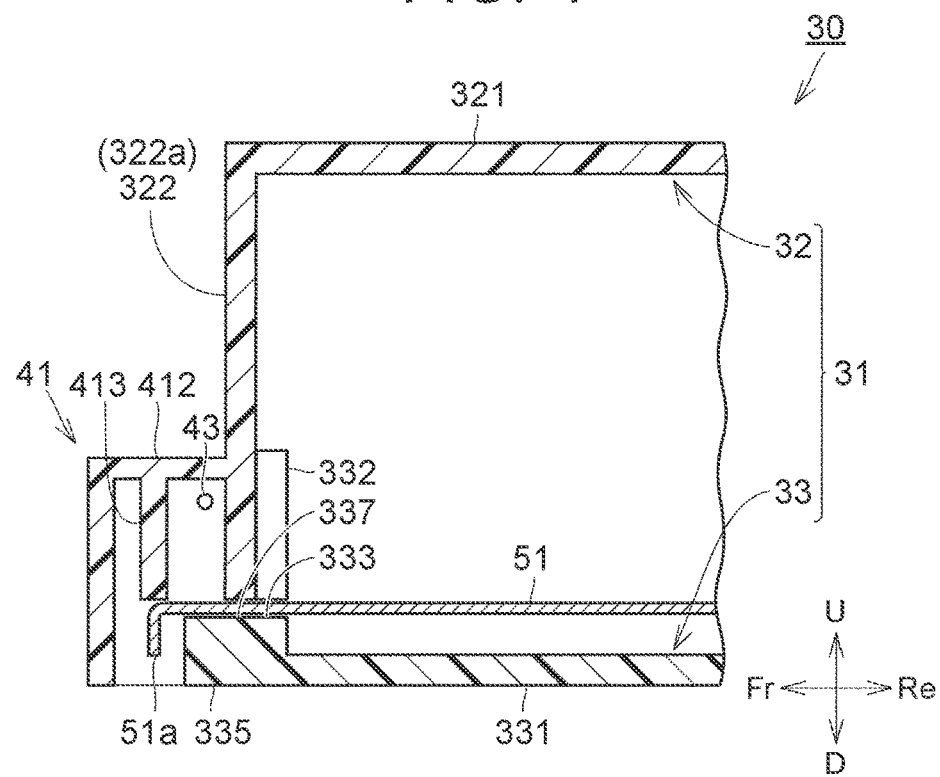
FIG. 4 is a schematic sectional view taken along the line IV-IV in FIG. 2.

FIG. 2 is a schematic perspective view illustrating the upper side of the junction box 30 according to the first embodiment. FIG. 3 is a schematic perspective view illustrating the lower side of the junction box 30 according to the first embodiment. FIG. 4 is a schematic sectional view taken along the line IV-IV in FIG. 2. Referring to FIGS. 2 to 4, the junction box 30 will be described.

As illustrated in FIGS. 2 to 4, the junction box 30 includes a housing 31 having a plurality of side wall portions 322, and a liquid detection portion 50. The housing 31 includes an upper case 32 and a closure member 33. The upper case 32 has a generally box shape that is open downward.

The upper case 32 has a top plate portion 321 and the side wall portions 322. The top plate portion 321 has a generally rectangular shape in plan view. The side wall portions 322 are provided to extend downward from the peripheral edge of the top plate portion 321. The side wall portions 322 include a front wall portion 322a and a rear wall portion 322b. In the disposition state where the junction box 30 is disposed in the housing case 15, the front wall portion 322a faces forward, and the rear wall portion 322b faces rearward.

In the disposition state described above, the front wall portion 322a and the rear wall portion 322b face each other in the front-rear direction of the vehicle 100. The front wall portion 322a has one end 322a1 on one side in its width direction crossing the front-rear direction of the vehicle 100. In the disposition state described above, the width direction of the front wall portion 322a is generally parallel to the right-left direction of the vehicle 100.

As illustrated in FIGS. 3 and 4, the closure member 33 is provided to close an opening of the upper case 32. The closure member 33 includes a base portion 331, an upright wall portion 332, a first protruding portion 335, and a second protruding portion 336.

The base portion 331 has a generally flat plate shape. The base portion 331 has a shape corresponding to the opening of the upper case 32. The upright wall portion 332 is provided to rise from a peripheral edge portion of the base portion 331. Facing portions 337 facing a lower end of the side wall portion 322 are each provided at an edge portion of the base portion 331. The facing portions 337 are provided outward of the upright wall portion 332.

The upright wall portion 332 is provided to be fitted to the inner peripheral surface defined by the side wall portions 322. Two cutout portions 333 are provided in the upright wall portion 332 to enable a first terminal portion 51 and a second terminal portion 52 to be drawn out, which will be described later. The two cutout portions 333 are each recessed toward the base portion 331.

The first protruding portion 335 protrudes into a first cover portion 41, which will be described later, so as to approach a distal end 51a of the first terminal portion 51. The second protruding portion 336 protrudes into a second cover portion 42, which will be described later, so as to approach a distal end 52a (see FIG. 5) of the second terminal portion 52. With the first protruding portion 335 and the second protruding portion 336 provided in this way, it is possible to suppress the entry of foreign matter into the first cover portion 41 and the second cover portion 42 and thus is possible to suppress the entry of foreign matter into the housing 31.

The liquid detection portion 50 includes the first terminal portion 51 and the second terminal portion 52. The first terminal portion 51 and the second terminal portion 52 are directed toward the lower side of one of the side wall portions 322 and drawn out (extend) from the inside of the housing 31 to the outside of the housing 31. Specifically, the first terminal portion 51 and the second terminal portion 52 are drawn out to the outside of the housing 31 from the front wall portion 322a side. The first terminal portion 51 and the second terminal portion 52 are drawn out to the outside of the housing 31 on the one end 322a1 side of the front wall portion 322a.

More specifically, the first terminal portion 51 passes through one of the two cutout portions 333 and is drawn out to the outside of the housing 31 through a gap between the lower end of the side wall portion 322 (more specifically, the front wall portion 322a) and one of the facing portions 337. The second terminal portion 52 passes through the other one of the two cutout portions 333 and is drawn out to the outside of the housing 31 through a gap between the lower end of the side wall portion 322 (more specifically, the front wall portion 322a) and the other one of the facing portions 337.

The gap between the lower end of the side wall portion 322 and the facing portion 337 at a portion where the first terminal portion 51 passes through corresponds to a first passing-through portion where the first terminal portion 51 passes through the housing 31. Likewise, the gap between the lower end of the side wall portion 322 and the facing portion 337 at a portion where the second terminal portion 52 passes through corresponds to a second passing-through portion where the second terminal portion 52 passes through the housing 31.

Each of the first passing-through portion and the second passing-through portion is not limited to the gap between the lower end of the side wall portion 322 and the facing portion 337 of the closure member 33 described above, and changes can be made as appropriate. For example, hole portions, cutout portions, or the like provided in the side wall portion 322 may be used as long as the first terminal portion 51 and the second terminal portion 52 are allowed to pass therethrough, respectively.

The distal end 51a side of the first terminal portion 51 drawn out from the housing 31 is bent downward. That is, the distal end 51a of the first terminal portion 51 is located at a position lower than the first passing-through portion.

Likewise, the distal end 52a side of the second terminal portion 52 drawn out from the housing 31 is bent downward. That is, the distal end 52a of the second terminal portion 52 is located at a position lower than the second passing-through portion.

As illustrated in FIGS. 2 to 4, the first cover portion 41 and the second cover portion 42 are provided to the side wall portion 322 (more specifically, the front wall portion 322a) from which the first terminal portion 51 and the second terminal portion 52 are drawn out. The first cover portion 41 is open downward and covers the first terminal portion 51. The second cover portion 42 is open downward and covers the second terminal portion 52. The first cover portion 41 and the second cover portion 42 respectively protect the first terminal portion 51 and the second terminal portion 52.

The first cover portion 41 is provided with a first through-hole 43 at a position higher than the distal end 51a of the first terminal portion 51. Specifically, the first through-hole 43 is provided in an upper portion of the first cover portion 41.

Likewise, the second cover portion 42 is provided with a second through-hole 44 at a position higher than the distal end 52a of the second terminal portion 52. Specifically, the second through-hole 44 is provided in an upper portion of the second cover portion 42.

Further, the first cover portion 41 is provided with an extending portion 413 extending from a top plate portion 412 toward the first terminal portion 51. The extending portion 413 serves as a presser that suppresses upward warping of the first terminal portion 51 drawn out to the outside of the housing 31.

Although not illustrated in FIG. 4, the second cover portion 42 is also provided with an extending portion extending from a top plate portion toward the second terminal portion 52. The extending portion serves as a presser that suppresses upward warping of the second terminal portion 52 drawn out to the outside of the housing 31.

Figure 5:
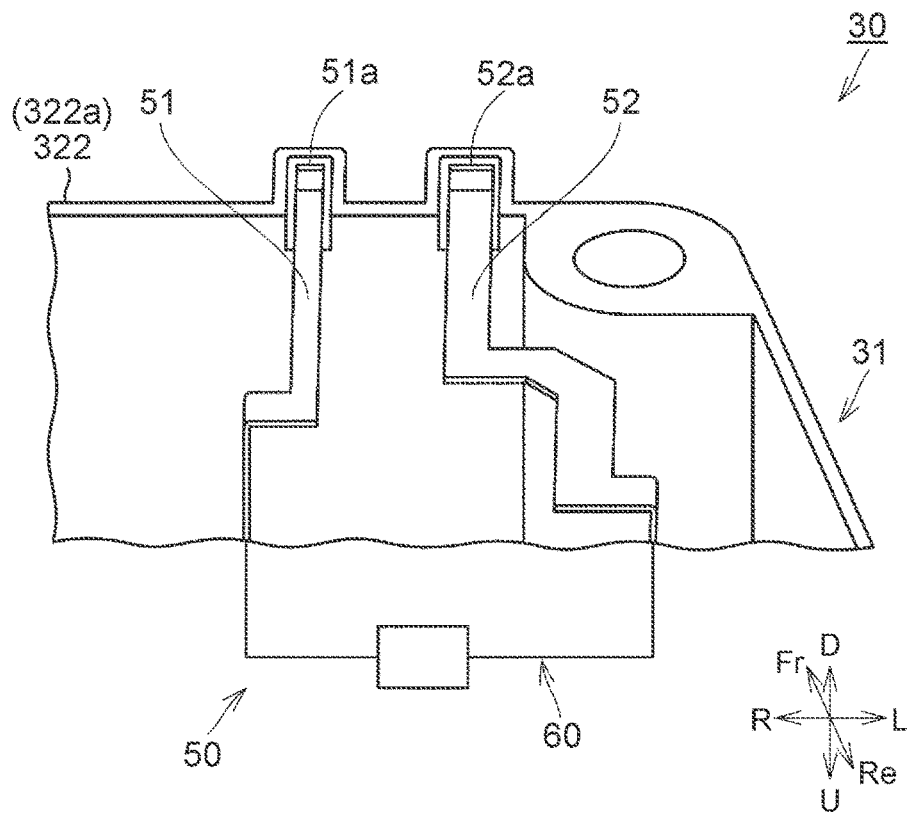
FIG. 5 is a schematic perspective view illustrating a state in which a closure member is removed in the junction box according to the first embodiment.

FIG. 5 is a schematic perspective view illustrating a state in which the closure member 33 is removed in the junction box 30 according to the first embodiment. In FIG. 5, for convenience, the first terminal portion 51 and the second terminal portion 52 are mainly illustrated as the structures in the housing 31, and the other structures are omitted.

As illustrated in FIG. 5, the first terminal portion 51 and the second terminal portion 52 are arranged in the housing 31 and connected to a liquid detection circuit 60 forming a part of the liquid detection portion 50. When the first terminal portion 51 and the second terminal portion 52 conduct to each other through a liquid present around the housing 31, a current flows in the liquid detection circuit 60. By detecting the current, the liquid detection portion 50 can detect the liquid that is present around the junction box 30.

As described above, in the junction box 30 according to the first embodiment, the first terminal portion 51 and the second terminal portion 52 are directed toward the lower side of one of the side wall portions 322 and drawn out from the inside of the housing 31 to the outside of the housing 31.

Therefore, by disposing the junction box 30 in the housing case 15 (more specifically, on the bottom portion 16 of the housing case 15) housing the power storage modules 20, when a liquid enters the housing case 15, it is possible to easily cause the first terminal portion 51 and the second terminal portion 52 to come in contact with the liquid present around the housing 31. Consequently, the first terminal portion 51 and the second terminal portion 52 easily conduct to each other through the liquid present around the housing 31. As a result, with the junction box 30 and the power storage device 10 including the junction box 30 according to the first embodiment, it is possible to easily detect a liquid around the junction box 30.

There are cases where the vehicle 100 equipped with the power storage device 10 is inclined downward on the front side during the travel. In such a case, the housing case 15 housing the junction box 30 is also inclined downward toward the front side. In this case, a liquid having entered the housing case 15 also moves toward the front side. Therefore, as described above, by drawing out the first terminal portion 51 and the second terminal portion 52 from the front wall portion 322a side of the housing 31 located on the front side to which the liquid tends to move, the detection of the liquid is further facilitated.

In addition, as described above, by drawing out the first terminal portion 51 and the second terminal portion 52 to the outside of the housing 31 on the one end 322a1 side of the front wall portion 322a, the first terminal portion 51 and the second terminal portion 52 can be arranged in close proximity to each other. In this case, the electrical resistance of a liquid connecting the first terminal portion 51 and the second terminal portion 52 to each other can be made small so that the detection of the liquid is furthermore facilitated.

As described above, the first cover portion 41 is provided with the first through-hole 43 at the position higher than the distal end 51a of the first terminal portion 51, and the second cover portion 42 is provided with the second through-hole 44 at the position higher than the distal end 52a of the second terminal portion 52.

Therefore, when a liquid enters the first cover portion 41 and the second cover portion 42, the air in the first cover portion 41 and the second cover portion 42 can be discharged to the outside through the first through-hole 43 and the second through-hole 44, respectively. Consequently, the liquid can easily enter the first cover portion 41 and the second cover portion 42.

Second Embodiment

Figure 6:
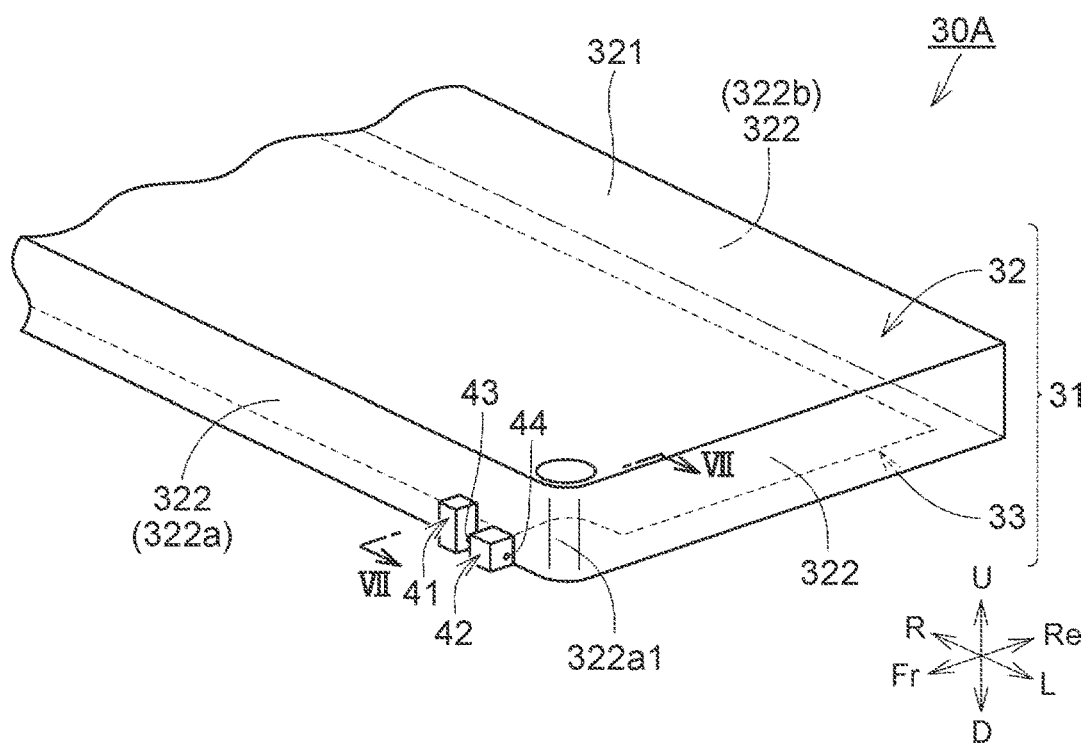
FIG. 6 is a schematic perspective view illustrating the upper side of a junction box according to a second embodiment.
Figure 7:
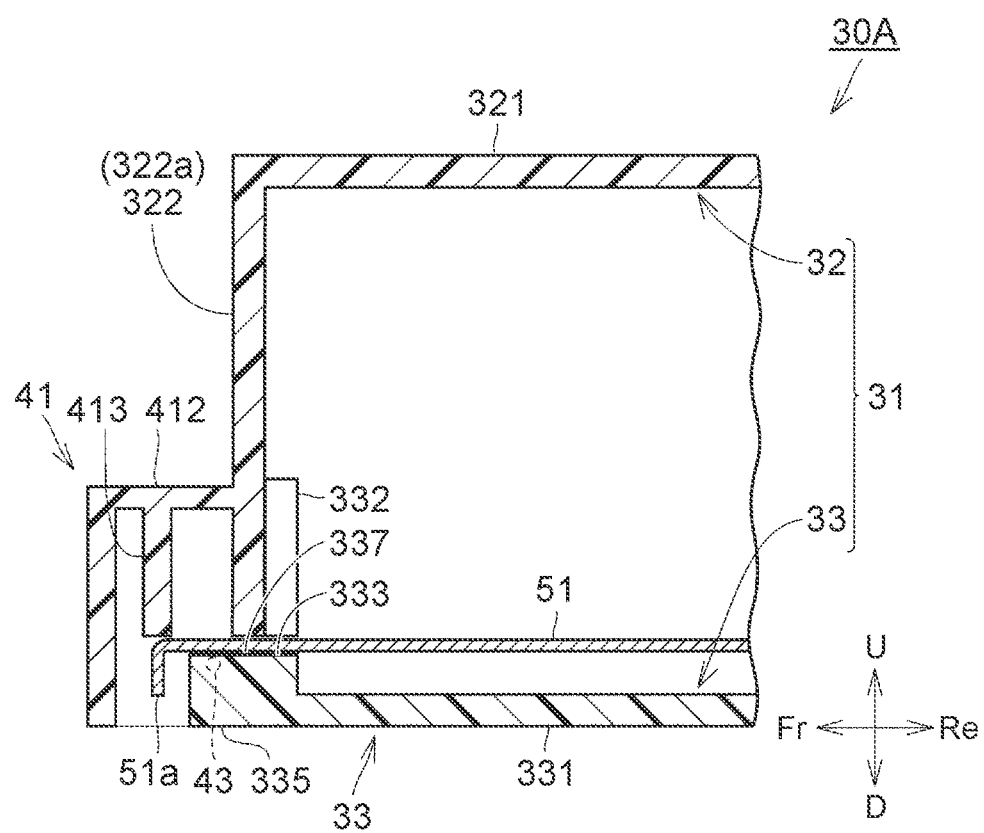
FIG. 7 is a schematic sectional view taken along the line VII-VII in FIG. 6.

FIG. 6 is a schematic perspective view illustrating the upper side of a junction box 30A according to a second embodiment. FIG. 7 is a schematic sectional view taken along the line VII-VII in FIG. 6. Referring to FIGS. 6 and 7, the junction box 30A according to the second embodiment will be described.

As illustrated in FIGS. 6 and 7, the junction box 30A according to the second embodiment differs from the junction box 30 according to the first embodiment in the arrangement of the first through-hole 43 provided in the first cover portion 41 and the second through-hole 44 provided in the second cover portion 42. The other configuration is almost the same as that of the first embodiment.

The first through-hole 43 is provided at a position higher than the distal end Ma of the first terminal portion 51 and lower than the first passing-through portion described above. Likewise, the second through-hole 44 is provided at a position higher than the distal end 52a of the second terminal portion 52 and lower than the second passing-through portion described above.

Even in the case configured as described above, the junction box 30A according to the second embodiment can obtain almost the same effect as the first embodiment. The junction box 30A according to the second embodiment can be applied to the power storage device 10 according to the first embodiment.

Herein, when a liquid enters the housing case 15 so that the liquid enters the first cover portion 41 and the second cover portion 42, the air pressure in the first cover portion 41 and the second cover portion 42 above the first through-hole 43 and the second through-hole 44 increases.

In the second embodiment, by setting the positions of the first through-hole 43 and the second through-hole 44 as described above, it is possible to suppress that the liquid having entered the first cover portion 41 and the second cover portion 42 reaches the first passing-through portion and the second passing-through portion located at positions higher than the first through-hole 43 and the second through-hole 44, respectively. As a result, it is possible to suppress the entry of the liquid into the housing 31.

The embodiments disclosed above are for illustrative purposes only and are not intended to be limitative in any aspect. The scope of the disclosure is defined by the scope of the claims, and all alterations within the scope of the claims and its equivalent meaning and scope are included in the scope of the disclosure.

What is claimed is:

1. A junction box comprising:
   a housing having a plurality of side wall portions; and
   a liquid detector including a first terminal portion and a second terminal portion, wherein
   the junction box is disposed in a housing case housing a power storage module,
   the first terminal portion and the second terminal portion are directed toward a lower side of one of the side wall portions and drawn out from an inside of the housing to an outside of the housing, and
   in a disposition state where the junction box is disposed in the housing case, the side wall portions include a front wall portion facing forward, and the first terminal portion and the second terminal portion are drawn out from a side of the front wall portion to the outside of the housing.

2. The junction box according to claim 1, wherein, in the disposition state, the front wall portion has one end on one side in a width direction crossing a front-rear direction, and the first terminal portion and the second terminal portion are drawn out to the outside of the housing on a side of the one end.

3. The junction box according to claim 1, wherein:
   the housing includes an upper case and a closure member, the upper case including the side wall portions and being open downward, and the closure member closing an opening of the upper case; and
   a first cover portion and a second cover portion are located at the one of the side wall portions from which the first terminal portion and the second terminal portion are drawn out, the first cover portion being open downward and covering the first terminal portion, and the second cover portion being open downward and covering the second terminal portion.

4. The junction box according to claim 3, wherein the closure member includes a first protruding portion and a second protruding portion, the first protruding portion protruding into the first cover portion to approach a distal end of the first terminal portion, and the second protruding portion protruding into the second cover portion to approach a distal end of the second terminal portion.

5. The junction box according to claim 3, wherein a first through-hole is located in the first cover portion at a position higher than a distal end of the first terminal portion, and a second through-hole is located in the second cover portion at a position higher than a distal end of the second terminal portion.

6. The junction box according to claim 5, wherein:
   a first passing-through portion through which the first terminal portion passes, and a second passing-through portion through which the second terminal portion passes are located in the housing;
   the distal end of the first terminal portion is located at a position lower than the first passing-through portion;
   the distal end of the second terminal portion is located at a position lower than the second passing-through portion;
   the first through-hole is located at a position lower than the first passing-through portion; and
   the second through-hole is located at a position lower than the second passing-through portion.

7. A power storage device comprising:
   a junction box including
      a housing having a plurality of side wall portions,
      a liquid detector including a first terminal portion and a second terminal portion, the junction box being disposed in a housing case housing a power storage module, and the first terminal portion and the second terminal portion being directed toward a lower side of one of the side wall portions and drawn out from an inside of the housing to an outside of the housing;
   the power storage module; and
   the housing case having a bottom portion and housing the power storage module and the junction box,
   wherein the junction box is fixed to the bottom portion of the housing case, and
   wherein, in a disposition state where the junction box is disposed in the housing case, the side wall portions include a front wall portion facing forward, and the first terminal portion and the second terminal portion are drawn out from a side of the front wall portion to the outside of the housing.

\* \* \* \* \*